US012371260B2

(12) United States Patent
Korge-Hårajuvet

(10) Patent No.: US 12,371,260 B2
(45) Date of Patent: Jul. 29, 2025

(54) SYSTEM AND METHOD OF OPERATING AN AUTOMATED STORAGE AND RETRIEVAL SYSTEM

(71) Applicant: Autostore Technology AS, Nedre Vats (NO)

(72) Inventor: Geir Korge-Hårajuvet, Vikedal (NO)

(73) Assignee: AutoStore Technology AS, Nedre Vats (NO)

(*) Notice: Subject to any disclaimer, the term of this patent is extended or adjusted under 35 U.S.C. 154(b) by 417 days.

(21) Appl. No.: 18/001,353

(22) PCT Filed: Jun. 8, 2021

(86) PCT No.: PCT/EP2021/065319
§ 371 (c)(1),
(2) Date: Dec. 9, 2022

(87) PCT Pub. No.: WO2021/259632
PCT Pub. Date: Dec. 30, 2021

(65) Prior Publication Data
US 2023/0234779 A1 Jul. 27, 2023

(30) Foreign Application Priority Data
Jun. 25, 2020 (NO) .................................. 20200743

(51) Int. Cl.
B65G 1/06 (2006.01)
B65G 1/04 (2006.01)
B65G 43/00 (2006.01)

(52) U.S. Cl.
CPC ........... B65G 1/065 (2013.01); B65G 1/0464 (2013.01); B65G 43/00 (2013.01); B65G 1/0478 (2013.01);
(Continued)

(58) Field of Classification Search
CPC .... B65G 1/065; B65G 1/0464; B65G 1/0478; B65G 43/00; B65G 2201/0235; B65G 2203/0283
See application file for complete search history.

(56) References Cited

U.S. PATENT DOCUMENTS 3,786,929 A * 1/1974 Hathcock, Jr. ....... B65G 1/0421
414/281
10,858,186 B2 * 12/2020 Hognaland .......... B65G 1/0478
(Continued)

FOREIGN PATENT DOCUMENTS

CN 101443220 A 5/2009
CN 104136296 A 11/2014
(Continued)

OTHER PUBLICATIONS

LIU Xuejun, Notification of Second Office Action for Chinese Patent Application No. 202180045357X, dated Nov. 27, 2024, 13 pages, pub. by SIPO, Beijing, China.
(Continued)

Primary Examiner — Saul Rodriguez
Assistant Examiner — Ashley K Romano
(74) Attorney, Agent, or Firm — Baker Botts L.L.P.

(57) ABSTRACT

An automated storage and retrieval system includes a rail system with a first set of parallel rails extending in a first direction and a second set of parallel rails extending in second direction. The second direction is perpendicular to the first direction. The system includes a plurality of container handling vehicles on the rail system operable to handle storage containers. Each container handling vehicle includes a positioning node and a local controller adapted to control movements of the container handling vehicle. The system includes a positioning system comprising at least three reference positioning nodes spaced in fixed positions on and/or proximate the rail system. The positioning system
(Continued)

is adapted to determine a position on the rail system for each of the container handling vehicles based on signal measurements between the positioning node of each container handling vehicle and the at least three reference positioning nodes. A control system is adapted to communicate with each local controller in each container handling vehicle and the positioning system. The control system is adapted to: instruct a first container handling vehicle to move to a target position, repeatedly receive position data from the positioning system of a position of the first container handling vehicle and repeatedly receive position data from the positioning system of a position of a second container handling vehicle, and instruct the second container handling vehicle to move with and follow the first container handling vehicle within a predetermined separation from the first container handling vehicle based on the received position data of the positions of the first and second container handling vehicles.

16 Claims, 11 Drawing Sheets

(52) U.S. Cl.
CPC ............... *B65G 2201/0235* (2013.01); *B65G 2203/0283* (2013.01)

(56) References Cited

U.S. PATENT DOCUMENTS

| | | | | |
|---|---|---|---|---|
| 2008/0181753 A1* | 7/2008 | Bastian | ............... | B65G 1/1376 414/277 |
| 2015/0175354 A1* | 6/2015 | Kharkover | .............. | E04H 6/225 414/807 |
| 2016/0016731 A1* | 1/2016 | Razumov | ............. | B65G 1/0492 414/807 |

FOREIGN PATENT DOCUMENTS

| | | |
|---|---|---|
| CN | 109348426 A | 2/2019 |
| NO | 317366 B1 | 10/2004 |
| WO | 2009/122080 A2 | 10/2009 |
| WO | 2014/075937 A1 | 5/2014 |
| WO | 2014/090684 A1 | 6/2014 |
| WO | 2015/193278 A1 | 12/2015 |
| WO | 2017/037095 A1 | 3/2017 |
| WO | 2017/121512 A1 | 7/2017 |
| WO | 2018/146304 A1 | 8/2018 |
| WO | 2018/210851 A1 | 11/2018 |
| WO | 2018/210923 A1 | 11/2018 |
| WO | 2019086237 A1 | 5/2019 |
| WO | 2019/122080 A1 | 6/2019 |
| WO | 2019/238670 A1 | 12/2019 |
| WO | 2021/008766 A1 | 1/2021 |

OTHER PUBLICATIONS

Office Action issued in the counterpart European Patent Application No. 21731999.5, mailed on Jan. 25, 2024 (5 pages).
International Search Report issued in Application No. PCT/EP2021/065319 mailed on Sep. 22, 2021 (5 pages).
Written Opinion issued in Application No. PCT/EP2021/065319 mailed on Sep. 22, 2021 (10 pages).
Norwegian Search Report issued in Norwegian Application No. 20200743 mailed on Jan. 29, 2021 (2 pages).
Liu Xuejun, First Office Action for Chinese Patent Application No. 202180045357X, dated May 29, 2024, 20 pages, pub.by SIPO, Beijing, China.
Liu Xuejun, "Decision of Rejection" for Chinese Patent Application No. 202180045357X, dated Feb. 26, 2025,19 pages, pub by SIPO, Beijing, China.

* cited by examiner

SYSTEM AND METHOD OF OPERATING AN AUTOMATED STORAGE AND RETRIEVAL SYSTEM

FIELD OF THE INVENTION

The present invention relates to an automated storage and retrieval system for storage and retrieval of containers, in particular to moving a container handling vehicle with a second container handling vehicle based on position measurements.

BACKGROUND AND PRIOR ART

FIG. 1 discloses a typical prior art automated storage and retrieval system 1 with a framework structure 100 and FIGS. 2 and 3 disclose two different prior art container handling vehicles 201, 301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. Containers 106 stored in the columns 105 are accessed by the container handling vehicles through access openings 112 in the rail system 108. The container handling vehicles 201, 301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. At least one of the sets of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201, 301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y- direction, while each storage cell may be identified by a container number in the X-, Y and Z-direction.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119, 120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201, 301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201, 301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system 500 which typically is computerized and which typically comprises a database for keeping track of the storage containers 106.

WO2017121512, the contents of which are incorporated herein by reference, describes a storage system, where the container handling vehicles are arranged with sensors that can detect the location of the vehicle, and proximity sensor to detect the location of nearby vehicles, and communicate that information to the control system 500. The control system communicates with a plurality of container handling vehicles and commands the container handling vehicles to form a "train" of vehicles, i.e. a plurality of container handling vehicles proximately arranged in series and arranged to move with one another in tandem. The assembly of the train is accomplished with help of the sensors in the container handling vehicles, by the control system's knowledge about the container handling vehicles' relative positions, or a combination of both. However, the position of a container handling vehicle on the rail system is not known with certainty until it has passed a track crossing, after which the position of the container handling vehicle may be transmitted to the control system which processes this information. This results in a delay due to the command being relayed through, and processed in, the control system, and in insufficient positioning information for effective train driving for the container handling vehicles. Various methodologies to mitigate this problem is described, such as adding proximity sensors on each container handling vehicle or physical coupling such as latches, magnetic coupling etc.

In view of the above, it is desirable to provide an automated storage and retrieval system, and a method for operating such a system, that improves the control of the container handling vehicles.

SUMMARY OF THE INVENTION

The present invention is set forth and characterized in the independent claims, while the dependent claims describe other characteristics of the invention.

In one aspect, the invention is related to an automated storage and retrieval system comprising:
- a rail system with a first set of parallel rails extending in a first direction and a second set of parallel rails extending in second direction, wherein the second direction is perpendicular to the first direction;
- a plurality of container handling vehicles on the rail system operable to handle storage containers, each container handling vehicle comprising a positioning node and a local controller adapted to control movements of the container handling vehicle;
- a positioning system comprising at least three reference positioning nodes spaced in fixed positions on and/or proximate the rail system, the positioning system being adapted to determine a position on the rail system for each of the container handling vehicles based on signal measurements between the positioning node of each container handling vehicle and the at least three reference positioning nodes; and
- a control system adapted to communicate with each local controller in each container handling vehicle and the positioning system, the control system being adapted to:
  - instruct a first container handling vehicle to move to a target position;
  - repeatedly receive position data from the positioning system of a position of the first container handling vehicle and repeatedly receive position data from the positioning system of a position of a second container handling vehicle; and
  - instruct the second container handling vehicle to move with and follow the first container handling vehicle within a predetermined separation based on the received position data of the positions of the first and second container handling vehicles.

An advantage of this system is that it allows a plurality of container handling vehicles to form a "train" of vehicles, i.e. a plurality of container handling vehicles proximately arranged in series and arranged to move with one another in tandem, one after the other separated by the predetermined separation.

The target position may be any position on the rail system. The target position may be a final position on the rail system, such as port position, or the target position may be any intermediate positions on its way to a final position. The vehicle may for example be instructed to move to a first position on the rail system where the vehicle waits for another vehicle to pass, before getting instructions to move to a second position in step-by-step instructions.

Instructing the second container handling vehicle to move with and follow the first container handling vehicle may comprise instructing the second container handling vehicle to accelerate or decelerate until the second container handling vehicle is at the predetermined separation from the first container handling vehicle based on the received position data of the positions of the first and second container handling vehicles.

Instructing the second container handling vehicle to move with and follow the first container handling vehicle may comprise instructing the second container handling vehicle to move at a set speed based on the received position data of the positions of the first and second container handling vehicles.

Instructing the second container handling vehicle to move with and follow the first container handling vehicle may comprise instructing the second container handling vehicle to change speed at an acceleration or deceleration based on the received position data of the positions of the first and second container handling vehicles to stay within the predetermined separation.

Instructing the second container handling vehicle to move with and follow the first container handling vehicle may comprise instructing the second container handling vehicle to move to a position that is at the predetermined separation from the position of the first container handling vehicle based on the received position data of the positions of the first and second container handling vehicles.

The position at the predetermined separation from the position of the first container handling vehicle that the second container handling vehicle is instructed to move to may be a position at a predetermined separation from a future position of the first container handling vehicle determined based on a current speed and heading of the first container handling vehicle.

The signal measurements may be time of flight (TOF) measurements. More specifically, the TOF-measurements may be time difference of arrival (TDOA) measurements. TDOA, as discussed below requires less messaging than Two Way Ranging (TWR) and may be advantageously used when the number of container handling vehicles to be positioned increases.

The positioning node of each container handling vehicle and the at least three reference positioning nodes may be Ultra-Wideband (UWB) nodes. UWB is defined by the UWB PHY layer defined in the IEEE 802.15.4-2011 revision standard and provides position resolution in the centimetre range.

In a second aspect, the invention relates to a method for controlling movement of a plurality of container handling vehicles in the system described above. The method comprises
- instructing the first container handling vehicle to move to the target position,
- repeatedly receiving the position data from the positioning system of a position of the first container handling vehicle and repeatedly receiving the position data from the positioning system of a position of the second container handling vehicle, and
- instructing the second container handling vehicle to move with and follow the first container handling vehicle within a predetermined separation from the first container handling vehicle based on the received position data of the positions of the first and second container handling vehicles The step of instructing the second container handling vehicle to move with and follow the first container handling vehicle may comprise instructing the second container handling vehicle to accelerate or decelerate until the second container handling vehicle is at the predetermined separation from the first container handling vehicle based on the received position data of the positions of the first and second container handling vehicle.

The step of instructing the second container handling vehicle to move with and follow the first container handling vehicle may comprise instructing the second container handling vehicle to move at a set a speed based on the received position data of the positions of the first and second container handling vehicle.

The step of instructing the second container handling vehicle to move with and follow the first container handling vehicle, the method may comprise instructing the second container handling vehicle to move to a position at the predetermined separation from the position of the first container handling vehicle. In one embodiment, the position at the predetermined separation from the position of the first container handling vehicle that the second container handling vehicle is instructed to move to may be a position at a predetermined separation from a future position of the first container handling vehicle determined based on a current speed and heading of the first container handling vehicle.

The position of the first container handling vehicle and the position of the second container handling vehicle may be determined using time of flight (TOF) measurements. Specifically, the TOF-measurements may be time difference of arrival (TDOA).

In a third aspect, the invention provides a computer program product for a control system in the system described above, wherein the computer program product comprises instructions which when executed on the control system performs the method described above.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
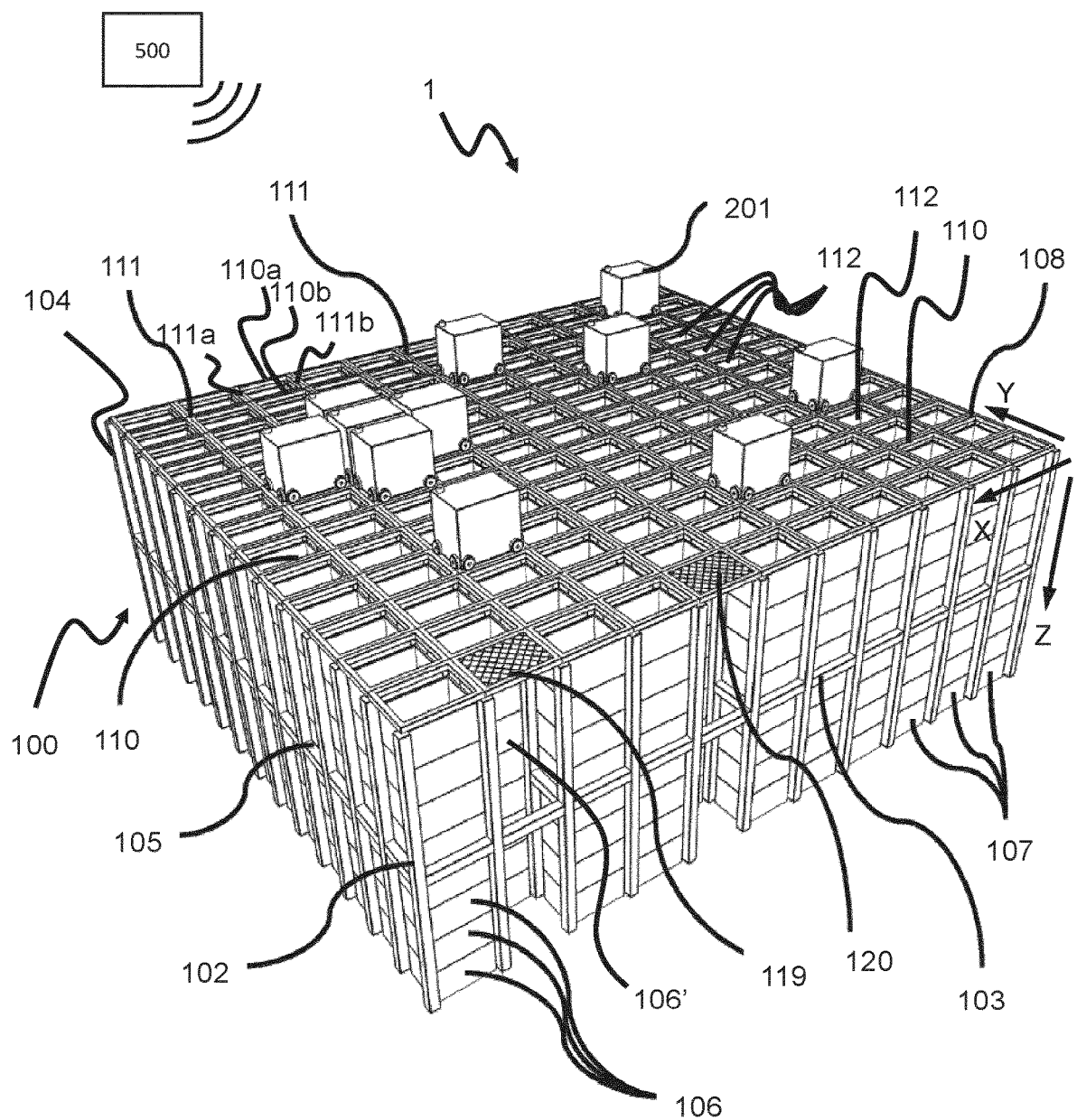
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
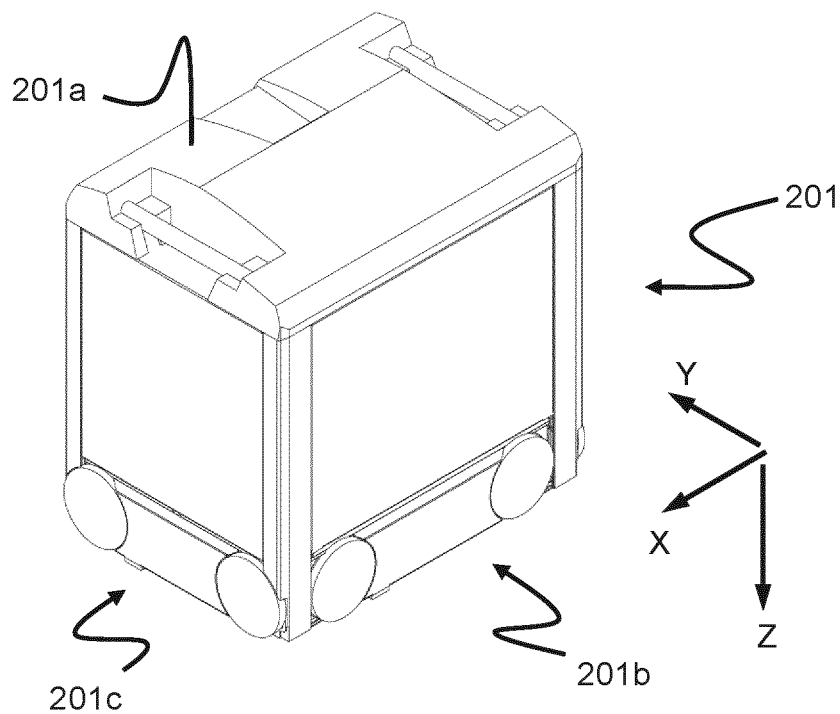
FIG. 2 is a perspective view of a prior art container handling vehicle having a centrally arranged cavity for carrying storage containers therein.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 4-13.

Figure 4:
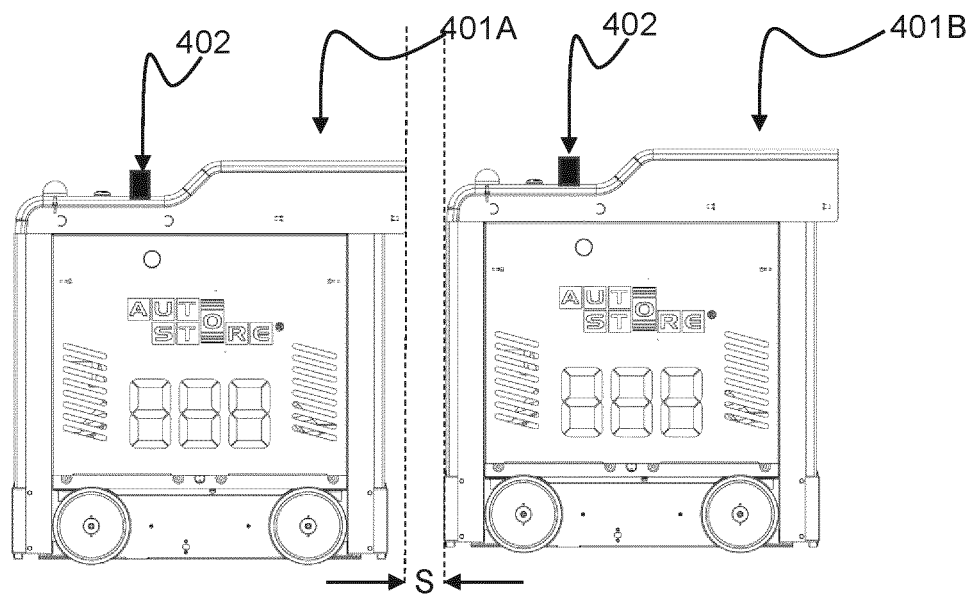
FIG. 4 is a side view of two container handling vehicles forming a train of vehicles.

FIG. 4 illustrates two container handling vehicles 401 forming a "train" of vehicles, where the two container handling vehicles 401 move with one another at a predetermined separation S. Each container handling vehicle 401 comprises a positioning node 402. The positioning node 402 may be positioned in any suitable position exterior or interior to the container handling vehicle 401. The control system 500 may know the position of the positioning node 402 on the container handling vehicle 401 relative to the outer dimensions of the container handling vehicle. It may therefore be sufficient to know the separation between the two positioning nodes 402 to determine the separation S between the two container handling vehicles 401. The predetermined separation S may be fixed in the control system 500 or vary depending on speed of the container handling vehicles etc. The predetermined separation should be as small as possible, preferably smaller than 10 cm. A small predetermined separation provides for shorter trains and more effective use of available rails system space.

Figure 5:
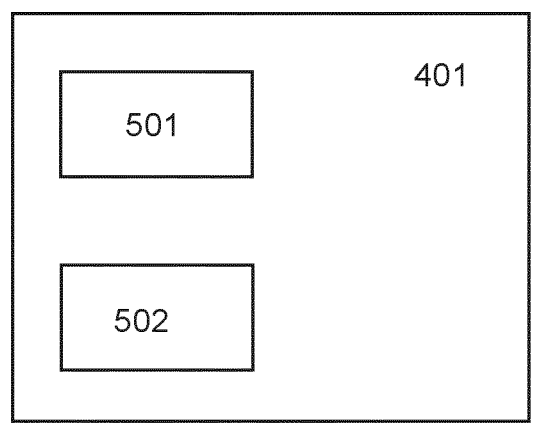
FIG. 5 is a schematic illustration of a container handling vehicle.

FIG. 5 schematically illustrates the container handling vehicle 401 comprising a positioning node 501, and a local controller 502 adapted to control movements of the container handling vehicle. The local controller 502 is in communication with the control system over a wireless communication link. The positioning node 501 may communicate with the control system directly or via the local controller 502. In other embodiments, the positioning node 501 may only communicate with reference positioning nodes (reference positioning nodes 701, 702, 703 shown in FIG. 7) spaced in fixed positions on and/or proximate the rail system 108, 608.

Figure 6A:
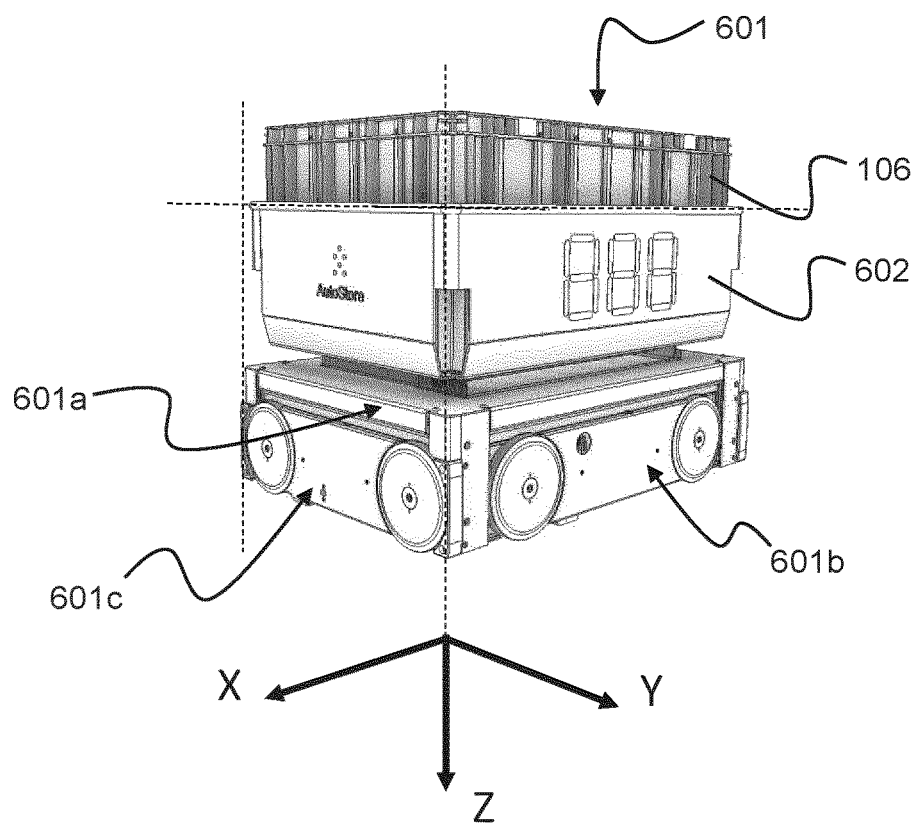
FIG. 6a is a perspective view of a container handling vehicle for container delivery.
Figure 6B:
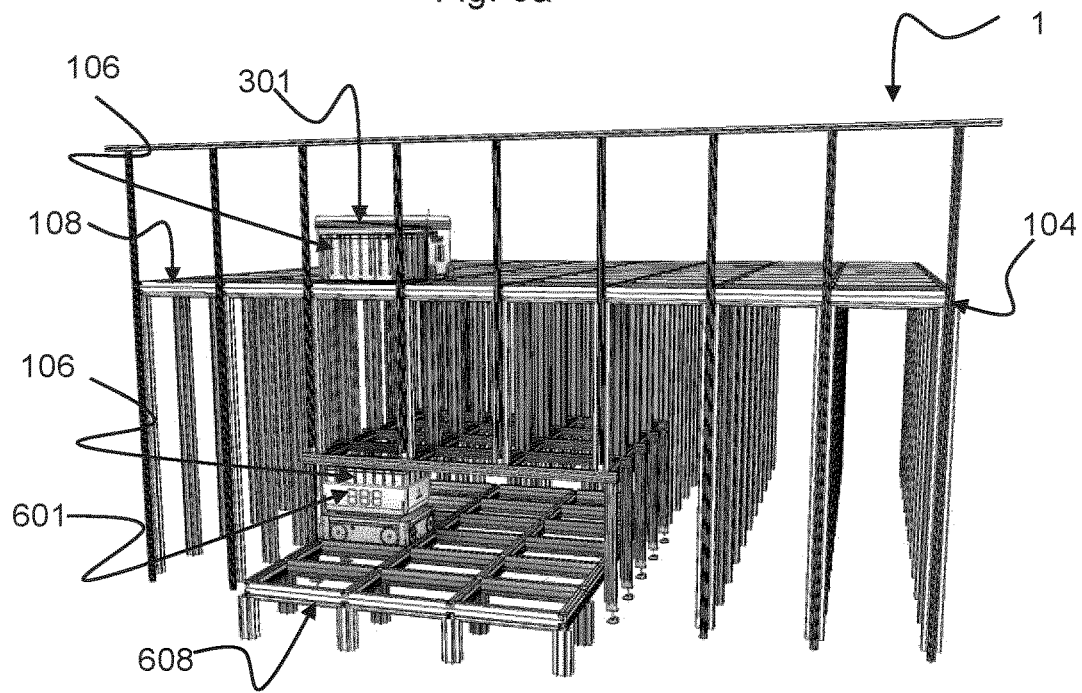
FIG. 6b is a perspective view of a storage system comprising a cantilever container handling vehicle operating on a rail system of a grid, and a container handling vehicle for container delivery operating on a lower rail system.

FIG. 6 illustrates another container handling vehicle according to an embodiment of the invention. FIG. 6a shows a container handling vehicle 601 for container delivery, and FIG. 6b shows the container handling vehicle 601 in relation to an automated storage and retrieval system 1.

As FIG. 6a illustrates, the container handling vehicle 601, which is in the form of a container delivery vehicle 601, is arranged for receiving a storage container 106 in a top-down manner, and therefore comprises a container carrier 602 arranged above a vehicle body 601a to receive a storage container 106 from above. The container delivery vehicle 601 comprises drive means 601b in first direction X, and drive means 601c in the second direction Y, similar to that of the other aforementioned container handling vehicles 201, 301, 401.

FIG. 6b illustrates a pair of container handling vehicles 301, 601, operating on upper and lower rail systems 108, 608.

The container delivery vehicle 601 operates on a rail system 608 below the rail system 108 of a storage grid 104 as shown. The delivery rail system 608 may be constructed in the same way or a similar way as the rail system 108 for the container handling vehicles 201, 301, 401 described in relation to FIG. 1.

Figure 3:
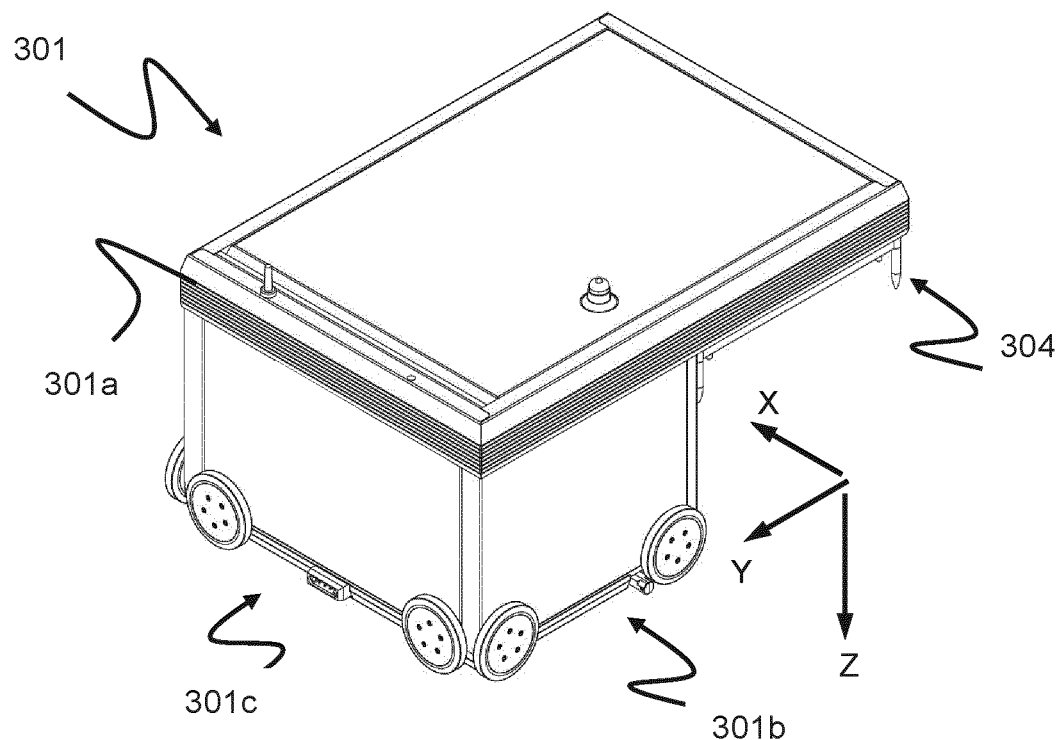
FIG. 3 is a perspective view of a prior art container handling vehicle having a cantilever for carrying storage containers underneath.

A container handling vehicle 301, according to the embodiment of FIG. 3 is shown operating on the rail system 108 of the storage grid 104. However, as will be apparent to the person skilled in the art, any kind of container handling vehicle 201, 301, 401 may be operated on the rail system 108 of the grid. The container handling vehicles 301 operating on an upper rail system 108 may thus lower storage containers down to container delivery vehicles 601 operated on the lower rail system 608. The container delivery vehicles 601 are typically arranged for delivery of storage containers 106 to an access point (not shown) at the periphery of the rail system 108, where the storage containers 106 may be picked. Though not illustrated herein, the lower rail system 608 typically comprises a multitude of container delivery vehicles 601, and as they move between cells below port columns and access points on the periphery of the lower rail system 608, problems of congestion and queuing may arise. Thus, the invention is advantageously applied to rail systems 608 with container delivery vehicles 601 in a similar manner as for container handling vehicles 201, 301, 401 of a rail system 108 of a grid 104.

Figure 7:
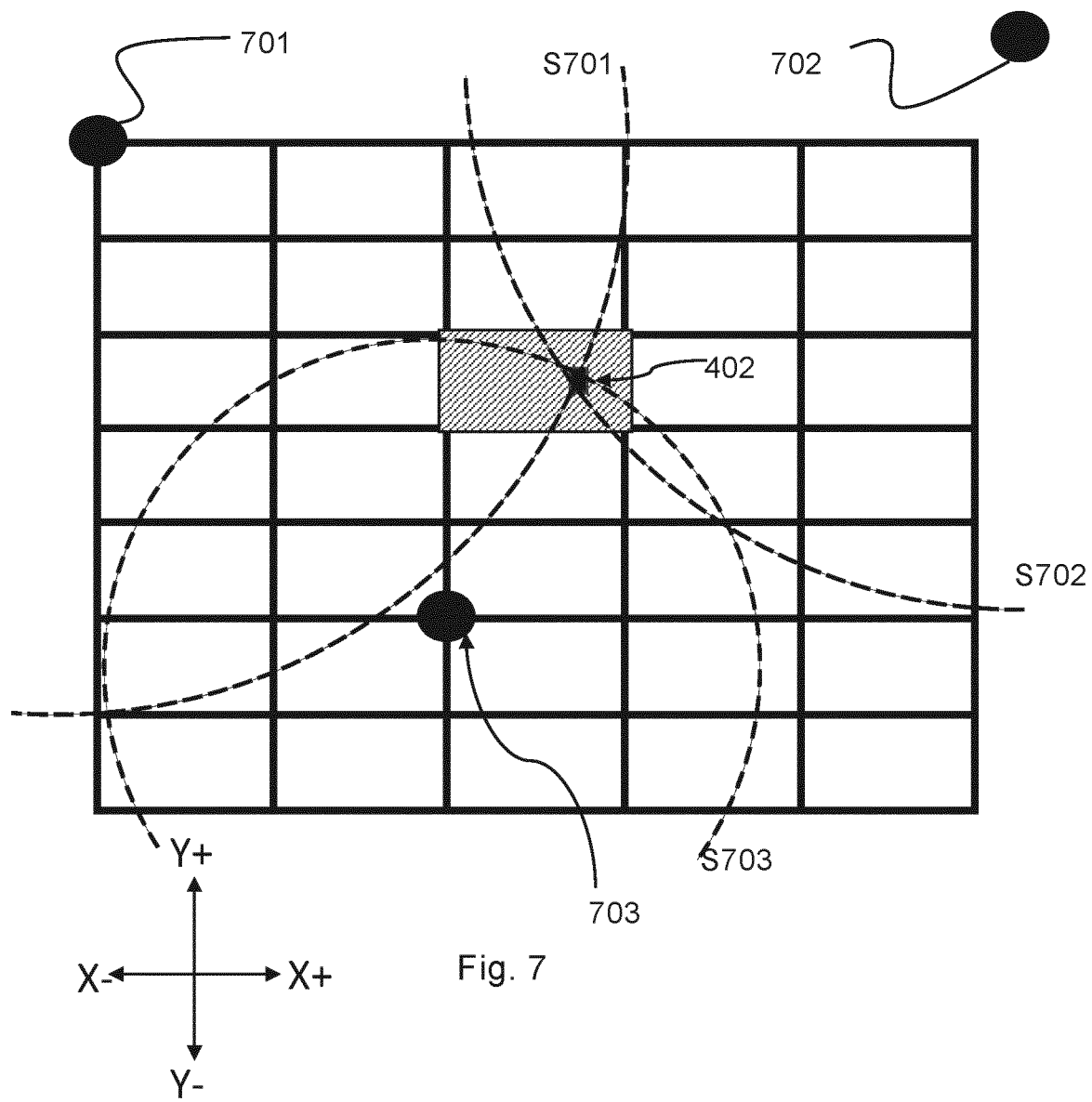
FIG. 7 is a top view of a rail system, illustrating a positioning system.

FIG. 7 is a top view of the rail system 108 of the system 1. The system 1 comprises a positioning system comprising at least three reference positioning nodes 701, 702, 703, spaced in fixed positions on and proximate the rail system 108. The positioning system is adapted to determine the position of the container handling vehicles 401 on the rail system 108 based on signal measurements between the positioning node 402 of each container handling vehicle 401 and the at least three reference positioning nodes 701, 702, 703. The reference positioning nodes 701, 702, 703 and the positioning node 402 on the container handling vehicle 401 are off-the-shelf products and various methods of signal measurements may be used to determine the position of the positioning node 402 on the grid.

One such method used for traditional radio technologies such as Bluetooth or Wi-Fi is Received Signal Strength Indicator, RSSI, where the positioning node 402 measures signal strength to each of the at least three reference positioning nodes 701, 702, 703 and combines this with a propagation model to determine the distance to each point. The positioning system may, based on the measured distances and a knowledge of the position of the reference positioning nodes 701, 702, 703 on the grid 108, use multilateration techniques to determine the position of the positioning node 402 on the grid as illustrated by the three intersecting spheres S701, S702, S703 in FIG. 7.

Another method used for the traditional radio technologies are time of flight, TOF, measurements. For these systems the TOF is measured by sending a message between the positioning node 402 and each of the at least three reference positioning nodes 701, 702, 703, and measure the time from sending the message to receiving an acknowledgement message, ACK. Again, multilateration techniques may be used to determine the position of the positioning node 402 on the grid.

A problem with the traditional radio technologies, relying on modulated sine waves to transmit information, is dealing with multipath signal propagation causing localization errors. Wi-Fi positioning systems have resolution of 2-4 meters.

For efficient train driving of the container handling vehicles it would be advantageous to have a position resolution of decimeters instead of meters. In one advantageous embodiment of the present invention, the positioning node 402 of each container handling vehicle and the at least three reference positioning nodes 701, 702, 703 are Ultra-Wideband (UWB) nodes. UWB is defined by the UWB PHY layer defined in the IEEE 802.15.4-2011 revision standard.

UWB utilizes a train of impulses rather than a modulated sine wave to transmit information. This characteristic makes it perfect for precise ranging applications. Since the pulse occupies such a wide frequency band, its rising edge is very steep and this allows the receiver to very accurately measure the arrival time of the signal. The pulses themselves are very narrow, typically no more than two nanoseconds. Due to the nature of the signals, UWB pulses can be distinguished even in noisy environments, and the signals are resistant to multipath effects. All of these traits give UWB a big advantage over traditional narrowband signals in case of ranging capabilities. Also due to a strict spectral mask, the transmission power lies at the noise floor, which means that UWB does not interfere with other radio communication systems operating in the same frequency bands, since it just increases the overall noise floor. The framework structure 100 of the system 1 is susceptible for multipath effects and UWB positioning is suitable to overcome those problems. UWB positioning systems has a resolution in the decimeter range, and so offers much finer resolution than for the known WiFi positioning systems.

UWB positioning systems use one of two different methods for Time of Flight measurements for positioning. One method is two-way ranging, TWR. For TWR, three messages have to be sent, the positioning node 402 sends a poll message to one of the at least three reference positioning nodes 701, 702, 703, the poll message comprising a time of sending Poll, TSP. The one of the at least three reference positioning nodes 701, 702, 703, records the time of poll reception, TRP, and replies with a response message at a time TSR. The positioning node 402 records the response message time, TRR. The positioning node 402 sends a final message, comprising TSP, TRR and the time of sending final message, TSF, to the one of the at least three reference positioning nodes 701, 702, 703, which records the time of reception of the final message, TRF. It is then possible to calculate the TOF and the distance. When the distances to at least three reference positioning nodes 701, 702, 703 has been determined, multilateration techniques may be used to determine the position of the positioning node 402 on the grid 108.

$$TOF=[(TRR-TSP)-(TSR-TRP)+(TRF-TSR)-(TSF-TRR)]/4$$

$$Distance=TOF\times(speed\ of\ light)$$

The one of the at least three reference positioning nodes 701, 702, 703, may determine the TOF and distance by itself, or it may forward the information to a real time location server, RTLS, in communication with the at least three reference positioning nodes 701, 702, 703, for the RTLS to perform the determination. The determined distance may also be sent in a message back to positioning node 402. The RTLS of the positioning system repeatedly reports position data of the position of each of the positioning nodes 402 to the control system 500.

A second method for Time of Flight measurements for UWB positioning systems is Time Difference of Arrival, TDoA, that is based on precise measurements of time difference between signals arrival to the at least three reference positioning nodes 701, 702, 703. In this method the at least three reference positioning nodes 701, 702, 703 need to be accurately synchronized, and so they need to run the same clock. The positioning node 402 transmits in a regular interval (refresh rate) a short Blink message. The Blink message is received by all reference positioning nodes 701, 702, 703 within the communication range of the positioning node 402. Each of the reference positioning nodes 701, 702, 703 records the time of Blink message reception, e.g. timestamps TR701, TR702, TR703, and transmits the timestamps to the RTLS server. The RTLS-server uses multilateration techniques to determine the position of the positioning node 402 based on the time difference of arrival TR701, TR702, TR703.

An advantage of TDoA over TWR is that the positioning node 402 doesn't communicate with the reference positioning nodes 701, 702, 703. While TWR requires 9 messages to localize the positioning node 402, TDoA requires only one. Furthermore, the positioning node 402 uses only a short time to send the Blink message, therefore a high number of positioning nodes 402 may transmit a Blink message within the regular interval (refresh rate). TDoA may therefore be advantageously used when the number of container handling vehicles 201, 301, 401, 601 to be positioned increases.

The automated storage and retrieval system 1 comprises, as discussed above, a computerized control system 500 which comprises a database for keeping track of the storage containers 106. The control system 500 is adapted to communicate with the local controller 502 in each container handling vehicle 201, 301, 401, 601, e.g. to send instructions to the container handling vehicle on where to move on the grid 108, or where to pick up or drop a storage container 106. The control system 500 is also adapted to communicate with the positioning system, e.g. the RTLS-server, to receive real time position data for each of the container handling vehicles 201, 301, 401, 601. The positioning system provides the control system 500 with knowledge about the container handling vehicles' relative positions such that the control system 500 may instruct the container handling vehicles to form a "train" of vehicles, i.e. a plurality of container handling vehicles proximately arranged in series and arranged to move with one another in tandem. The control system 500 is adapted to instruct a first container handling vehicle to move to a target position, repeatedly receive position data from the positioning system of a position of the first container handling vehicle and repeatedly receive position data from the positioning system of a position of a second container handling vehicle, and instruct the second container handling vehicle to move with and follow the first container handling vehicle within a predetermined separation S from the first container handling vehicle based on the received position data of the positions of the first and second container vehicles. The predetermined separation between the first container handling vehicle and the second container handling vehicle may be fixed in the control system 500 or vary depending on speed of the container handling vehicles etc. The predetermined separation may be viewed as a target separation between the first container handling vehicle and the second container handling vehicle. As the vehicles move independently of each other the instantaneous separation may vary within a given tolerance of the predetermined separation. The second container handling vehicle may be instructed to speed up if it falls behind, or slow down if it comes too close. The given tolerance may be plus/minus 25%, plus/minus 10%, plus/minus 5%, plus/minus 1%, and may vary depending on the configuration of the automated storage and retrieval system. Various factors as the type of container handling vehicles, the total number of container handling vehicles etc. may influence the given tolerance.

Figure 8:
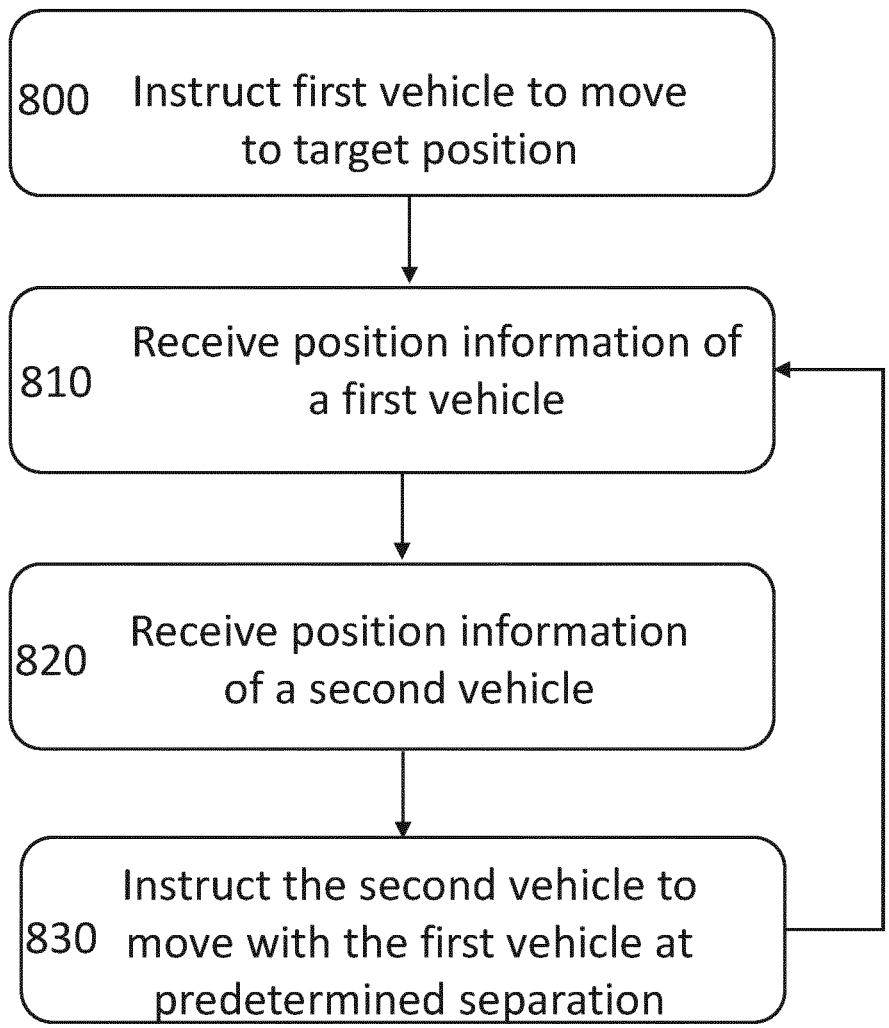
FIG. 8 is a flow chart illustrating the steps of a method of operating an automated storage and retrieval system.

FIG. 8 is a flow diagram schematically representing the steps of a method for operating an automated storage and retrieval system 1.

The method is typically initiated by a step 800 where the control system 500 instructs a first container handling vehicle 401A to move to a target position TA. A target position may typically be a storage column, on rail system 108, 608. The local controller of the first container handling vehicle 401 receives the instructions and initiates movement of the first container handling vehicle 401A towards the target position TA. The control system 500 knows that it intends to create a train of container handling vehicles moving together towards the target position TA. The train comprises at least a second container handling vehicle 401B. In steps 810 and 820, the control system 500 receives the position data from the positioning system of a position of the first container handling vehicle 401A and receives the position data from the positioning system of a position of the second container handling vehicle 401B. The order of receiving the position information of the first container handling vehicle 401A prior to receiving the position information of the second container handling vehicle 401A is arbitrary chosen for the simplicity of illustration. The step 820 may instead precede the step 810, or step 810 and 820 may occur substantially at the same time.

The positioning system determines the positions of the first container handling vehicle 401A and the second container handling vehicle 401B by performing signal measurements between the positioning node 402 of each container handling vehicle 401A, 401B and the at least three reference positioning nodes 701, 702, 703. In step 830, the control system 500 instructs the second container handling vehicle 401B to move with and follow the first container handling vehicle 401B at a predetermined separation S from the first container handling vehicle 401A. The local controller of the second container handling vehicle 401B receives the instructions and initiates movement of the second container handling vehicle 401B towards the first container handling vehicle 401A until it is at the predetermined separation S and continues to move with the first container handling vehicle at the predetermined separation S. In so doing, the second container handling vehicle 401B follows the first container handling vehicle 401A. The control system 500 repeatedly receives the position data from the positioning system of the position of the first container handling vehicle 401A and repeatedly receives the position data from the positioning system of the position of the second container handling vehicle 401B, as illustrated by the method returning to step 810. After receiving updated position information, the control system may send instructions to the second container handling vehicle 401B to again instruct the second container handling vehicle 401B to move with the first container handling vehicle 401A at the predetermined separation S.

In the following, with reference to FIGS. 9-13, various steps of methods of operating an automated storage and retrieval system are exemplified in accordance with the invention.

Figure 9:
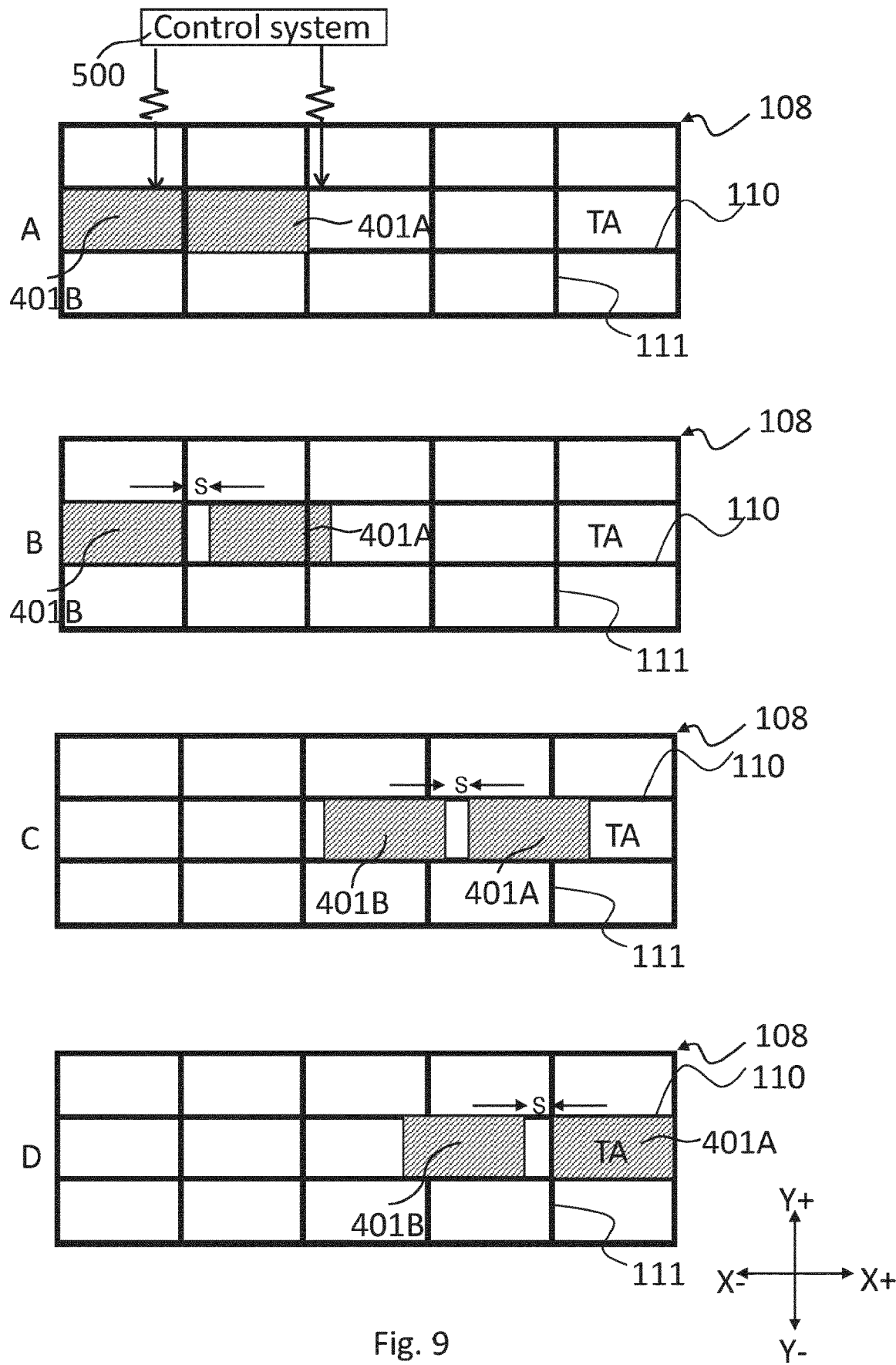
FIG. 9 is a schematic top view of a rail system, illustrating steps of a method where the container handling vehicles move in the same direction.

FIG. 9 is a schematic top view of a rail system 108, illustrating steps of a method where two container handling vehicles 401A, 401B controlled by the control system 500 are forming a train of vehicles. The two container handling vehicles 401A, 401B are initially in adjacent cells on the rail system 108 as shown in in FIG. 9A. In FIG. 9A the control system instructs a first container handling vehicle 401A to move towards a target position TA. The target position may be any position on the rail system. The target position may be a final position on the rail system, such as port position, or the target position may be any intermediate positions on its way to a final position. The vehicle may for example be instructed to move to a first position on the rail system where the vehicle waits for another vehicle to pass, before getting instructions to move to a second position in step-by-step instructions. The control system 500 receives position data from the positioning system of a position of the first container handling vehicle 401A and position data from the positioning system of a position of a second container handling vehicle 401B. Once the separation between the first and second container handling vehicle is within a predetermined separation S, as shown in FIG. 9B, the second container handling vehicle 401A is instructed to move with and follow the first container handling vehicle within the predetermined separation S.

As illustrated in FIG. 9C, the first container handling vehicle 401A acts as the locomotive, and the position of the second container handling vehicle 401B is adjusted relative to the first container handling vehicle 401A by the control system when the position data received from the position system indicates that the separation is different from the predetermined separation S. When the first container handling vehicle 401A arrives and stops at the target position TA, the second container handling vehicle 401B is instructed to stop in a position at the predetermined separation S as illustrated in FIG. 9D. As mention above, the target position of TA may not be the final position of the first container handling vehicle 401A, so the second container handling vehicle 401B is kept at the predetermined separation in case the first container handling vehicle 401A begins to move again towards a new target position (not shown). If the target position TA was the final position for the first container handling vehicle 401A, the control system 500 could instruct the second container handling vehicle 401B to move to a position adjacent the first container handling vehicle 401A.

If on the other hand, the second container handling vehicle 401B arrives at its own target position TB (not shown) prior to the first container handling vehicle 401A arriving at the target position TA, then the second container handling vehicle 401B would stop at the target position TB. That is, the second container handling vehicle stops moving with the first container handling vehicle 401A when arriving at TB.

Instructing the second container handling vehicle to move with and to follow the first container handling vehicle may comprise repeatedly instructing the second container handling vehicle 401B to move to a position that is at the predetermined separation S from the position of the first container handling vehicle 401A. That is, every time the controls system 500 receives position data from the positioning system of the position of the first container handling vehicle 401A, the control system 500 determines a new position the second container handling vehicle 401B should be in to be within the predetermined separation S from the position of the first container handling vehicle 401A.

Alternatively, instead of sending a message every time the second container handling vehicle 401B should move to move with the first container handling vehicle, the control system 500 may instruct the second container handling vehicle 401B to move with and to follow the first container handling vehicle 401A at a set speed. When the position data received from the position system indicates that the separation between the first and second container handling vehicles 401A, 401B is different from the predetermined separation S, the control system may instruct the second container handling vehicle 401B to accelerate or decelerate until the second container handling vehicle 401B again is at the predetermined separation S from the first container handling vehicle 401A. Once at the predetermined separation S, the second container handling vehicle 401B may be instructed to move at a set speed to move with and to follow the first container handling vehicle 401A.

Instructing the second container handling vehicle to move with and to follow the first container handling vehicle may prior to instructing the second container handling vehicle 401B to move with and follow the first container handling vehicle 401A, comprise instructing the second container handling vehicle 401B to move to a position that is at the predetermined separation S from the position of the first container handling vehicle 401A. The position at the predetermined separation S from the position of the first container handling vehicle 401A that the second container handling vehicle 401B is instructed to move to is a position at a predetermined separation S from a future position of the first container handling vehicle 401A. The future position of the first container handling vehicle 401A may be determine based on a current speed and heading of the first container handling vehicle 401A. Alternatively, as will be discussed below with reference to FIG. 10, the control system 500 knows where it will send the first container handling vehicle 401A and may determine to send the second container handling vehicle 401B to a position at predetermined separation S of that future position of the first container handling vehicle 401A. In some situations, this may save the time needed to form a train of vehicles.

Figure 10:
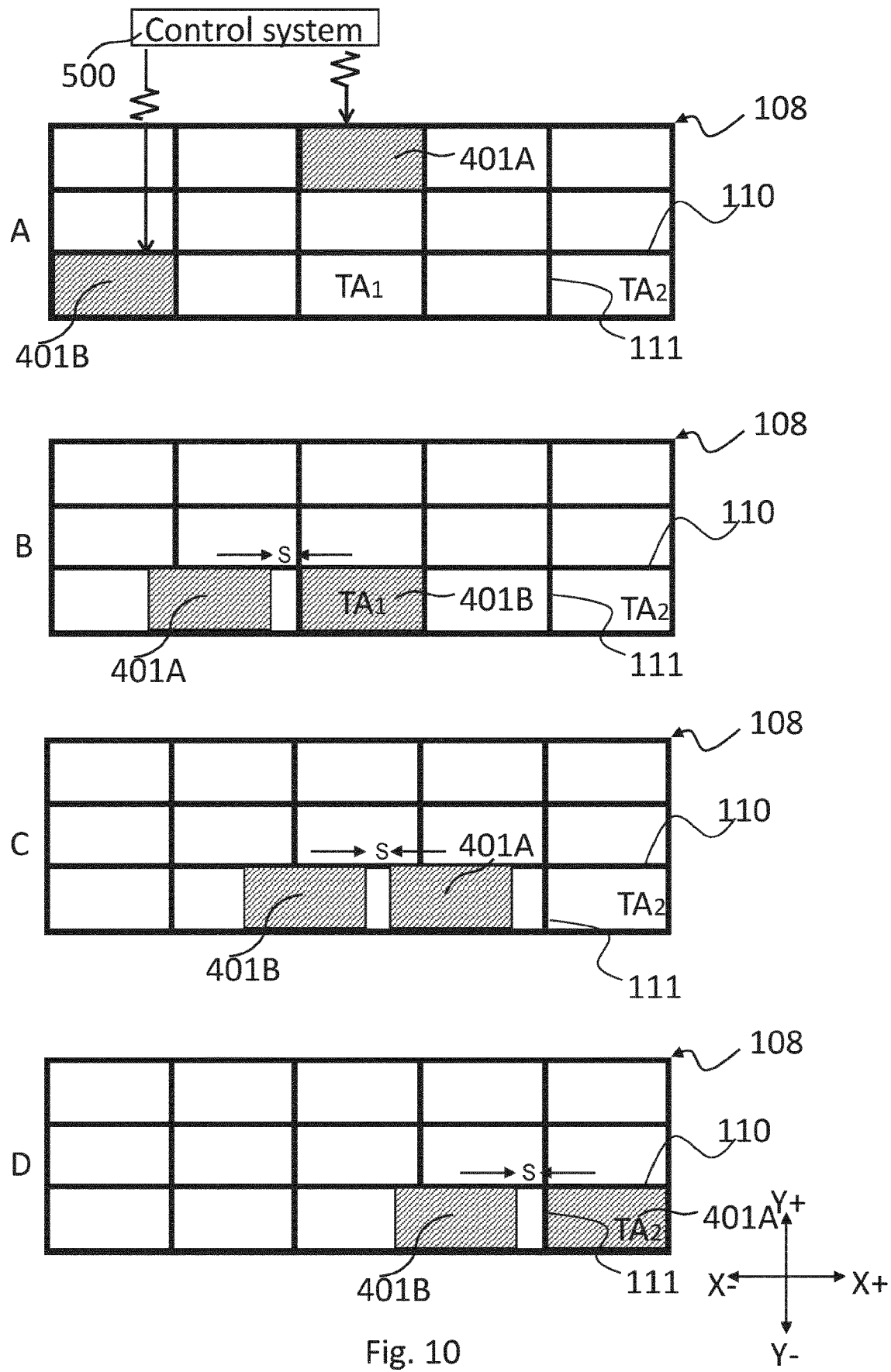
FIG. 10 is a schematic top view of a rail system, illustrating steps of a method similar to FIG. 9 but where the second container handling vehicle is sent to a future position of the first container handling vehicle.

FIG. 10 is a schematic top view of a rail system 108, illustrating steps of a method where two container handling vehicles 401A, 401B controlled by the control system 500 are forming a "train" of vehicles. The two container handling vehicles 401A, 401B are initially in different rows and columns on the rail system 108 as shown in in FIG. 10A. In FIG. 10A the control system instructs a first container handling vehicle 401A to move to a second target position TA$_2$. The control system 500 receives position data from the positioning system of a position of the first container handling vehicle 401A and position data from the positioning system of the position of the second container handling vehicle 401B. The control system 500 instructs the first container handling vehicle 401A to first move two rows in the Y– direction to a first target position $TA_1$ and knows that it from there will instruct the first container handling vehicle 401A to move two columns in the X+ direction to the second target position $TA_2$. Knowing where the first container handling device 401A will be in the future, the control system also instructs the second container handling vehicle 401B to move to a position that is at the predetermined separation S from the future position $TA_1$ of the first container handling vehicle 401A, as illustrated in FIG. 10B. The future position of the first container handling vehicle 401A may be determined based on a current speed and heading of the first container handling vehicle 401A. The instructions to the second container handling vehicle 401B may be timed such that the second container handling vehicle 401B reaches its position just in time for the first container handling vehicle to arrive. Alternatively, the instructions to the second container handling vehicle 401B may be timed such that the second container handling vehicle 401b arrives prior to the first container handling vehicle 401A arrives at the first target position $TA_1$.

Once the first container handing vehicle 401A and second container handling vehicle 401B are separated by the predetermined separation S as shown in FIG. 10B, the control system 500 instructs the first container handling vehicle 401A and the second container handling vehicle 401B to move as shown in FIGS. 10C and 10D as described above with reference to FIGS. 9C and 9D.

Figure 11:
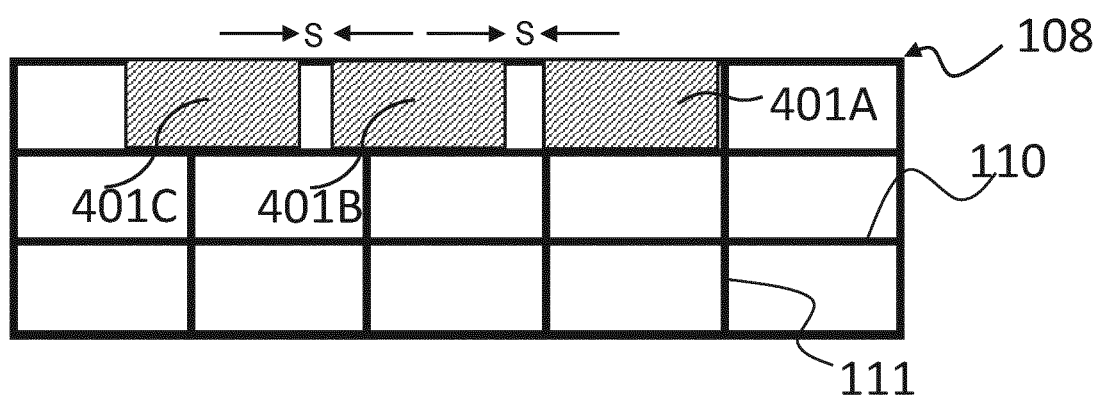
FIG. 11 is a schematic top view of a rail system, illustrating steps of a method similar to FIG. 9 adding a third container handling vehicle.

FIG. 11 is a schematic top view of a rail system 108, illustrating steps of a method where three container handling vehicles 401A, 401B, 401C controlled by the control system 500 are forming a "train" of vehicles. The container handling vehicles 401B, 401C move with and follow the first container handling vehicle 401A with a predetermined separation S between each pair of container handling vehicles. The predetermined separation S may be the same for each pair of container handling vehicles or vary for each of the pairs. Any number of container handling vehicles may move together with the first container handling vehicle 401A.

Figure 12:
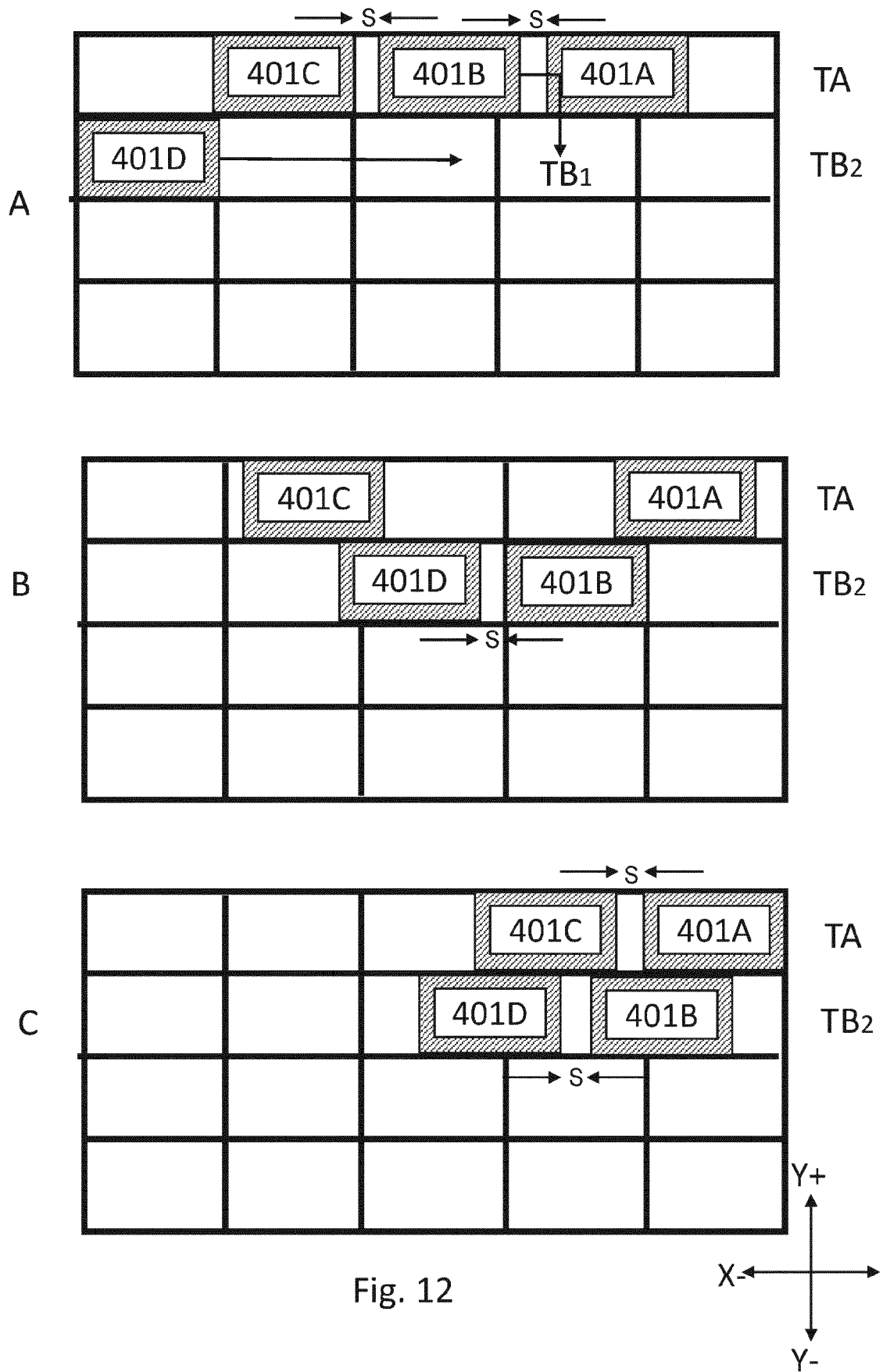
FIG. 12 is a schematic top view of a rail system, illustrating the steps of a method of separating and recombining trains of container handling vehicles.

FIG. 12 is a schematic top view of a rail system 108, illustrating steps of a method where a plurality of container handling vehicles controlled by the control system 500 forming a single train are split into two separate trains heading for different target positions. The uppermost row may in one exemplary implementation function as a motorway for large trains moving many container handling vehicles. The large train may be split into smaller trains of container handling vehicles moving on side roads, where the train may move slower and/or yield for other moving container handling vehicles. Three container handling vehicles 401A, 401B, 401C are initially on the same row of the rails system 108 as shown in FIG. 12A, moving in the X+ direction toward a target position TA (outside the illustrated rail section) for the first container handling vehicle 401A. The fourth container handling vehicle 401D is on another row. Two container handling vehicles 401B, 401C initially move with the first container handling vehicle 401A as discussed with reference to FIG. 10.

The control system 500 knows that the second container handling device 401B and the fourth container handling device 401D are heading towards a different target position $TB_2$ (outside the illustrated rail section) compared to the first container handling vehicle 401A. The controls system 500 may also know or determine that it would be advantageous to move the second container handling vehicle 401B and the fourth container handling vehicle 401D together as a train towards the target position $TB_2$. The control system 500 instructs the second container handling vehicle to move to a target position $TB_1$, that is, one row in the Y– direction. Knowing that the second container handling vehicle 401B will be at position $TB_1$ in the future, the control system 500 instructs the fourth container handling vehicle 401D to move to a position that is at the predetermined separation S from the future position $TB_1$, as illustrated in FIG. 12B. The fourth container handling vehicle 401D may reach the position just in time, or prior to the second container handling vehicle 401B arrives at $TB_1$. The fourth container handling vehicle 401D may in this example have to accelerate to arrive at the predetermined separation S from $TB_1$ in time.

The control system 500 also receives position data from the positioning system of the position of the first container handling vehicle 401A and position data from the positioning system of the position of the third container handling vehicle 401C and instructs the third container handling vehicle 401C to move with the first container handling vehicle 401A at the predetermined separation S. In this case, that would include first accelerating the third container handling vehicle 401C to catch up with the first container handling vehicle 401A, as illustrated in FIG. 12C. Furthermore, the fourth container handling vehicle 401D is instructed to move with the second container handling vehicle 401B at the predetermined separation S towards the target position $TB_2$. The same methodology could be used to include a smaller train or a single container handling device into another train.

Figure 13:
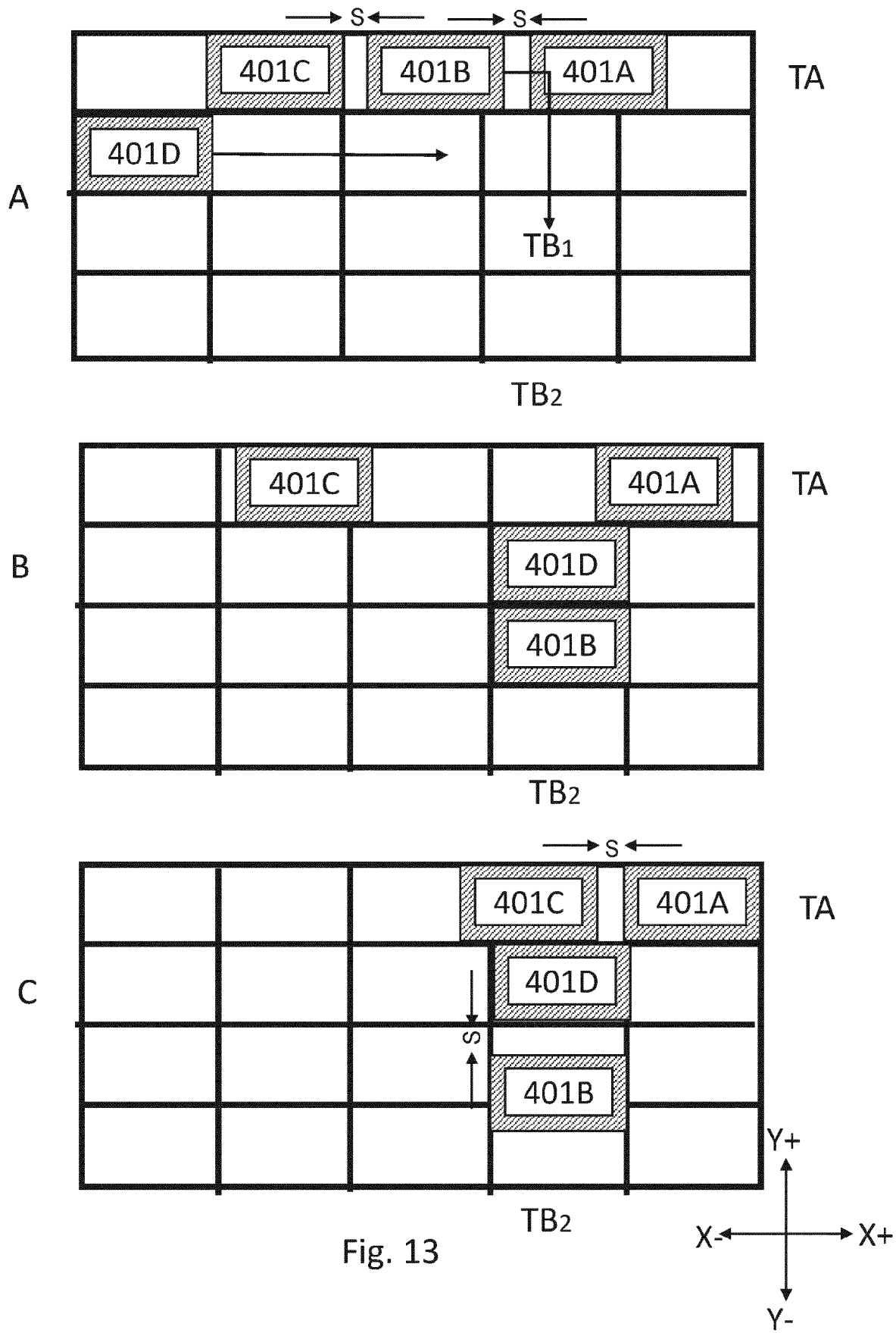
FIG. 13 is a schematic top view of a rail system, illustrating the steps of a method of separating and recombining trains of container handling vehicles.

The trains obviously do not have to move parallel to one another but may also move perpendicular to one another. FIG. 13 is a schematic top view of a rail system 108, illustrating steps of a method where a plurality of container handling vehicles controlled by the control system 500 forming a single train are split into two separate trains heading for different target positions. Three container handling vehicles 401A, 401B, 401C are initially on the same row of the rails system 108 as shown in FIG. 13A, moving in the X+ direction toward a target position TA (outside the illustrated rail section) for the first container handling vehicle 401A. The fourth container handling vehicle 401D is on another row. Two container handling vehicles 401B, 401C initially move with the first container handling vehicle 401A as discussed with reference to FIG. 10.

The control system 500 knows that the second container handling device 401B and the fourth container handling device 401D are heading towards a different target position $TB_2$ (outside the illustrated rail section) compared to the first container handling vehicle 401A. The controls system 500 may also know or determine that it would be advantageous to move the second container handling vehicle 401B and the fourth container handling vehicle 401D together as a train towards the target position $TB_2$. The control system 500 instructs the second container handling vehicle to move to a target position $TB_1$, that is, two rows in the Y– direction. Knowing that the second container handling vehicle 401B will be at position $TB_1$ in the future, the control system 500 instructs the fourth container handling vehicle 401D to move to a position that is at the predetermined separation S from the future position $TB_1$, as illustrated in FIG. 13B. The control system 500 knows that the second container handling vehicle 401B will have to pass this position before the fourth container handing vehicle 401B reaches that position, and times the fourth container handling vehicle 401B to arrive at the position after the second container handling vehicle 401D arrived at the target position $TB_1$. The fourth container handling vehicle 401D may in this example have to decelerate to arrive at the predetermined separation S from TB₁ after the second container handling vehicle 401B. As illustrated in FIG. 13B, in this case where the fourth container handling vehicle 401D move at a perpendicular angle to the second container handling vehicle 401B, the fourth container handling vehicle 401D may arrive in position closer than the predetermined separation S, before the second container handling vehicle 401B and the fourth container handling vehicle 401D is instructed to move together in the same direction Y– as illustrated in FIG. 13C.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction
401A Storage container vehicle
401B Storage container vehicle
401C Storage container vehicle
401D Storage container vehicle
402 RF positioning node
501 Local controller
502 RF positioning node
601 Container delivery vehicle
602 Container carrier of container delivery vehicle 601
601a Vehicle body of the container delivery vehicle 601
601b Drive means/wheel arrangement, first direction (X)
601c Drive means/wheel arrangement, second direction (Y)
608 Rail system for delivery vehicle
701 RF reference positioning node
702 RF reference positioning node
703 RF reference positioning node
S701 Sphere RF reference positioning node 701
S702 Sphere RF reference positioning node 702
S703 Sphere RF reference positioning node 703
800 Instruct first vehicle to move to target position
810 Receive position information of a first vehicle
820 Receive position information of a second vehicle
830 Instruct the second vehicle to move with the first vehicle at predetermined separation
TA Target position
S Separation

The invention claimed is:

1. An automated storage and retrieval system comprising:
a rail system with a first set of parallel rails extending in a first direction and a second set of parallel rails extending in second direction, wherein the second direction is perpendicular to the first direction;
a plurality of container handling vehicles on the rail system operable to handle storage containers, each container handling vehicle comprising:
a positioning node, and
a local controller adapted to control movements of the container handling vehicle;
a positioning system comprising at least three reference positioning nodes spaced in fixed positions on and/or proximate the rail system, the positioning system being adapted to determine a position on the rail system for each of the container handling vehicles based on signal measurements between the positioning node of each container handling vehicle and the at least three reference positioning nodes; and
a control system adapted to communicate with each local controller in each container handling vehicle and the positioning system, the control system being adapted to:
instruct a first container handling vehicle to move to a target position,
repeatedly receive position data from the positioning system of a position of the first container handling vehicle and repeatedly receive position data from the positioning system of a position of a second container handling vehicle, and
instruct the second container handling vehicle to move with and follow the first container handling vehicle within a predetermined separation from the first container handling vehicle based on the received position data of the positions of the first and second container handling vehicles.

2. The system of claim 1, wherein to instruct the second container handling vehicle to move with and follow the first container handling vehicle comprises instructing the second container handling vehicle to accelerate or decelerate until the second container handling vehicle is at the predetermined separation from the first container handling vehicle based on the received position data of the positions of the first and second container handling vehicles.

3. The system of claim 1, wherein to instruct the second container handling vehicle to move with and follow the first container handling vehicle comprises instructing the second container handling vehicle to move at a set speed based on the received position data of the positions of the first and second container handling vehicles.

4. The system of claim 1, wherein to instruct the second container handling vehicle to move with and follow the first container handling vehicle; comprises instructing the second container handling vehicle to move to a position that is at the predetermined separation from the position of the first container handling vehicle.

5. The system of claim 4, wherein the position at the predetermined separation from the position of the first container handling vehicle that the second container handling vehicle is instructed to move to is a position at a predetermined separation from a future position of the first container handling vehicle determined based on a current speed and heading of the first container handling vehicle.

6. The system of claim 1, wherein the signal measurements are time of flight measurements.

7. The system of claim 6, wherein the time of flight measurements are time difference of arrival measurements.

8. The system of claim 1, wherein the positioning node of each container handling vehicle and the at least three reference positioning nodes are Ultra-Wideband nodes.

9. A method for controlling movement of a plurality of container handling vehicles in the system according to claim 1, wherein the method comprises:
- instructing the first container handling vehicle to move to the target position,
- repeatedly receiving the position data from the positioning system of a position of the first container handling vehicle and repeatedly receiving the position data from the positioning system of a position of the second container handling vehicle, and
- instructing the second container handling vehicle to move with and follow the first container handling vehicle within a predetermined separation from the first container handling vehicle based on the received position data of the positions of the first and second container handling vehicles.

10. The method of claim 9, wherein the instructing the second container handling vehicle to move with and follow the first container handling vehicle comprises instructing the second container handling vehicle to accelerate or decelerate until the second container handling vehicle is at the predetermined separation from the first container handling vehicle based on the received position data of the positions of the first and second container handling vehicle.

11. The method of claim 9, wherein the instructing the second container handling vehicle to move with and follow the first container handling vehicle comprises instructing the second container handling vehicle to move at a set speed based on the received position data of the positions of the first and second container handling vehicles.

12. The method of claim 9, further comprising determining the position of the first container handling vehicle and the position of the second container handling vehicle using time of flight measurements.

13. The method of claim 12, wherein the measurements are time difference of arrival measurements.

14. The method of claim 9, wherein the instructing the second container handling vehicle to move with and follow the first container handling vehicle; comprises instructing the second container handling vehicle to move to a position at the predetermined separation from the position of the first container handling vehicle.

15. The method of claim 14, wherein the position at the predetermined separation from the position of the first container handling vehicle that the second container handling vehicle is instructed to move to is a position at a predetermined separation from a future position of the first container handling vehicle determined based on a current speed and heading of the first container handling vehicle.

16. A computer program product for a control system in an automated storage and retrieval system comprising:
- a rail system with a first set of parallel rails extending in a first direction and a second set of parallel rails extending in second direction, wherein the second direction is perpendicular to the first direction;
- a plurality of container handling vehicles on the rail system operable to handle storage containers, each container handling vehicle comprising:
- a positioning node, and
- a local controller adapted to control movements of the container handling vehicle;
- a positioning system comprising at least three reference positioning nodes spaced in fixed positions on and/or proximate the rail system, the positioning system being adapted to determine a position on the rail system for each of the container handling vehicles based on signal measurements between the positioning node of each container handling vehicle and the at least three reference positioning nodes; and
- the control system adapted to communicate with each local controller in each container handling vehicle and the positioning system, wherein the computer program product comprises instructions which when executed on the control system performs the method comprising:
- instructing the first container handling vehicle to move to the target position,
- repeatedly receiving the position data from the positioning system of a position of the first container handling vehicle and repeatedly receiving the position data from the positioning system of a position of the second container handling vehicle, and
- instructing the second container handling vehicle to move with and follow the first container handling vehicle within a predetermined separation from the first container handling vehicle based on the received position data of the positions of the first and second container handling vehicles.

* * * * *